(12) United States Patent
Atsatt

(10) Patent No.: US 6,182,107 B1
(45) Date of Patent: Jan. 30, 2001

(54) MANAGEMENT OF REFERENCE OBJECT LIFETIMES IN OBJECT ORIENTED PROGRAMS

(75) Inventor: Bryan P. Atsatt, Redwood City, CA (US)

(73) Assignee: Object Technology Licensing Corporation, Cupertino, CA (US)

( * ) Notice: Under 35 U.S.C. 154(b), the term of this patent shall be extended for 0 days.

(21) Appl. No.: 08/868,221

(22) Filed: Jun. 3, 1997

(51) Int. Cl.⁷ .................................................. G06F 13/00
(52) U.S. Cl. ................................................................. 709/100
(58) Field of Search ........................... 395/683; 709/307, 709/300, 302, 100; 707/206

(56) References Cited

U.S. PATENT DOCUMENTS

| | | | |
|---|---|---|---|
| 4,695,949 | * | 9/1987 | Thatte et al. .......................... 364/200 |
| 4,775,932 | * | 10/1988 | Oxley et al. .......................... 364/200 |
| 5,519,867 | * | 5/1996 | Moeller et al. ....................... 395/700 |
| 5,535,390 | * | 7/1996 | Hildebrandt .......................... 395/700 |
| 5,652,883 | * | 7/1997 | Adcock ................................... 395/622 |
| 5,918,235 | * | 6/1999 | Kirshenbaum et al. .............. 709/206 |

OTHER PUBLICATIONS

Martin, Johannes J., "Explicit Reference Counts," pp. 707–710, IEEE Press, Sep. 1996.*

Com/Corba Interworking, Digital Equipment Corporation, OMG TC Document 95.8.18, pp. 1–50, Aug. 22, 1995.*

The Component Object Model Specification version 0.9, Microsoft Corportion, pp. 35–50, Oct. 1995.*

* cited by examiner

Primary Examiner—Robert B. Harrell
(74) Attorney, Agent, or Firm—Kudirka & Jobse, LLP

(57) ABSTRACT

An object oriented system manages the life of objects referenced by other objects in the computer memory. A compiler compiles the various classes that are to be included in the object oriented program to be run on the computer. Some classes are the counted object class type that provides a count of the number of objects referencing a target counted object. Other classes are the uncounted object class type that does not provide a count of the number of objects referencing a target uncounted object. A counter wrapper class is included, whose instantiated object provides a count of the number of objects referencing a target uncounted object when the counter wrapper object is associated with the target uncounted object. A means is provided to determine whether a new target object is from the uncounted object class and, if so, that selectively causes the counter wrapper object to be associated with the new target object. The detection means may be a compiler program that performs the detection while the object oriented program is being compiled. Alternately, the detection means may be a universal class whose instantiated object performs the detection during the running of the compiled program. The counter wrapper object associated with the new target object, counts the number of objects referencing the new target object and initiates the destruction of the new target object when the number of objects referencing the new target object diminishes to none.

21 Claims, 11 Drawing Sheets

MANAGEMENT OF REFERENCE OBJECT LIFETIMES IN OBJECT ORIENTED PROGRAMS

FIELD OF THE INVENTION

The invention broadly relates to data processing systems and methods and more particularly relates to object oriented programming.

BACKGROUND OF THE INVENTION

1. Related Patents

The invention disclosed herein is related to the invention described in U.S. Pat. No. 5,315,703, entitled "OBJECT-ORIENTED NOTIFICATION FRAMEWORK SYSTEM", by David R. Anderson, et al., assigned to the same assignee as the invention disclosed herein and incorporated herein by reference.

The invention disclosed herein is related to the invention described in U.S. Pat. No. 5,519,867, entitled "OBJECT-ORIENTED MULTITASKING SYSTEM", by Eugenie L. Bolton, et al., assigned to the same assignee as the invention disclosed herein and incorporated herein by reference.

2. Discussion of the Background

A program in a procedural language such as Fortran or Basic, is a list of instructions that tell the computer to perform an operation. Large procedural programs are broken into subroutines with smaller lists of instructions. In a procedural language program, the emphasis is on performing operations, such as to display a text or read a disk. Variables in the procedural instructions are assigned values when instructions are executed, those values being derived from units of data read into the computer. The variables and the data are exposed to and can be manipulated by instructions in any part of the procedural program.

A program in an object oriented language such as C++ or Smalltalk, combines data and the instructions or methods that operate on the data into a single unit, the object. Typically, the programmer can limit the methods within the object to be the only route to manipulate the data contained in that object. This is the principle of encapsulation. In an object oriented program, the emphasis is on the entities that perform, represented by objects, not on the performance of operations, as in a procedural program.

The methods and variables for a particular object are defined by a class template. All objects which are instances of a given class are identical in form and behavior, but contain different data in their variables. Classes are organized in a tree structure representing the relationships among a set of classes. Classes higher in the hierarchy are superclasses. Classes lower in the hierarchy are subclasses. They can make use of the methods and variables defined in all classes above them on their branch of the class hierarchy, through the principle of inheritance. Subclasses inherit the methods and variables from their superclasses.

One object can signal another object to perform the methods contained in the receiving object, by sending a message. The message consists of the name of the receiver, the method it is to carry out, and any parameters the method may require to fulfill the request.

The variables within a method in an object may be assigned values by reference. A reference provides an alias for a variable. Instead of a value being passed to the function, a reference is passed to the original variable in the calling program. The programmer can have the function access the actual variables in the calling program. Another way to pass arguments to functions is to use pointers. A pointer variable, or simply a pointer, is a variable that holds an address value to data or to an object. Passing a pointer as an argument to a function is somewhat similar to passing a reference. They both permit the variable in the calling program to be modified by the function. However, whereas a reference is an alias for the original variable, a pointer is the address of the variable. This can be useful in accessing arrays of data. Pointers can point to objects as well as to simple data types. For example, an array of pointers allows easy access to a group of objects, and is more flexible than placing the objects themselves in an array. For instance, a group of objects can be sorted by sorting an array of pointers to the objects, instead of sorting the objects themselves.

The object oriented program written in source code by the programmer in the C++ or Smalltalk language, is compiled with a C++ or Smalltalk compiler. Then the compiled program is executed at runtime. During the running of the program, memory space can be unnecessarily occupied by objects that are no longer used. When an object is instantiated from a class that includes a pointer to a target class, an instance of the target class must also be instantiated, unless it already exists in the system memory. In early object oriented environments available in the prior art, when the referencing object was later destroyed, there was no way provided by the object oriented environment to also remove the target object. Unused objects would then accumulate in the system memory reducing the available free memory space. Later prior object oriented environments provided an automatic mechanism to reclaim memory space, by associating an up-down counter with each object that is the target of a pointer reference from another object. The counter is incremented with each additional referencing object. The counter is decremented when the referencing object is destroyed. When the counter returns to zero the target object is destroyed, thereby freeing the portion of the memory that it occupied.

Frequently, object oriented programs will load other programs, libraries, or other modules that contain objects that do not have the up-down counter destruction feature. The prior art does not have a way to automatically clear such objects from the memory after they are no longer used. What is needed is a mechanism to monitor objects during their lifetime in the memory, to manage those objects that do not have an up-down counter destruction feature.

The following references give some additional background on object oriented programming principles:

- Booch, Grady. *Object Oriented Design and Applications*. 2d ed. Redwood City, Calif.: Benjamin/Cummings, 1994.
- Budd, Timothy. *Introduction to Object-Oriented Programming*. Reading, Mass.: Addison-Wesley, 1991.
- Goldstein, Neil, and Jeff Alger. *Developing Object-Oriented Software for the Macintosh*. Reading, Mass.: Addison-Wesley, 1992.
- Meyer, Bertrand. *Object-Oriented Software Construction*. Englewood Cliffs, N.J.: Prentice Hall, 1988.
- Taylor, David A. *Object-Oriented Information Systems: Planning and Implementation*. Reading, Mass.: Addison-Wesley, 1992.
- Wirfs-Brock, Rebecca, et al. *Designing Object-Oriented Software*. Englewood Cliffs, N.J.: Prentice Hall, 1990.
- ISO/ANSI C++ Draft Standard, April 1995, American National Standards Institute.

SUMMARY OF THE INVENTION:

The invention is a mechanism added to the object oriented environment, that monitors objects during their lifetime in the memory. It detects those target objects that do not have an up-down counter destruction feature and then adaptively provides a wrapper for the uncounted objects, the wrapper including an up-down counter destruction feature. In one embodiment, the detection takes place while the object oriented program is being compiled. In another embodiment, the detection takes place during the running of the compiled program. In this manner, all target objects that are no longer in use, are automatically removed from the memory.

An object oriented system is disclosed for managing the life of objects referenced by other objects in the computer memory. A compiler compiles the various classes that are to be included in the object oriented program to be run on the computer. Some classes are the counted object class type that provides a count of the number of objects referencing a target counted object. Other classes are the uncounted object class type that does not provide a count of the number of objects referencing a target uncounted object. In accordance with the invention, a counter wrapper class is included, whose instantiated object provides a count of the number of objects referencing a target uncounted object when the counter wrapper object is associated with the target uncounted object. Further in accordance with the invention, a means is provided to determine whether a new target object is from the uncounted object class and, if so, that selectively causes the counter wrapper object to be associated with the new target object. The detection means may be a compiler program that performs the detection while the object oriented program is being compiled. Alternately, the detection means may be a universal class whose instantiated object performs the detection during the running of the compiled program. The counter wrapper object associated with the new target object, counts the number of objects referencing the new target object and initiates the destruction of the new target object when the number of objects referencing the new target object diminishes to none.

In one aspect of the invention, the universal class includes a constructor calling code that initiates instantiation of a referencing object for a new target object and increments the recorded number of objects referencing the new target object.

In another aspect of the invention, the constructor calling code determines whether the new target object is from the uncounted object class. If so, then the constructor calling code selectively invokes a constructor object to instantiate the counter wrapper object to be associated with the new target object. Then, the constructor calling code invokes the constructor object to instantiate a referencing object. Then, the constructor calling code initiates incrementing in the counter wrapper, the recorded number of objects referencing the new target object.

In another aspect of the invention, the constructor calling code determines whether the new target object is from the counted object class. If so, then the constructor calling code invokes the constructor object to instantiate a referencing object and initiates incrementing in the new target object, the recorded number of objects referencing the new target object.

In another aspect of the invention, the universal class includes a destructor calling code for invoking a destructor object to destroy an object referencing the new target object. The destructor calling code determines whether the new target object is from the uncounted object class. If so, then the destructor calling code selectively initiates decrementing in the counter wrapper, the recorded number of objects referencing the new target object. Then, the destructor calling code invokes a destructor object to destroy the counter wrapper object and the new target object if the number of objects referencing the new target object diminishes to none.

In another aspect of the invention, the universal class includes a destructor calling code for invoking a destructor object to destroy an object referencing the new target object. The destructor calling code determines whether the new target object is from the counted object class. If so, then the destructor calling code selectively initiates decrementing in the new target object, the recorded number of objects referencing the new target object. Then, the destructor calling code invokes a destructor object to destroy the new target object if the number of objects referencing the new target object diminishes to none.

DESCRIPTION OF THE FIGURES

The invention can be more fully appreciated with reference to the accompanying figures.

FIGS. 1 through 5 describe the first embodiment, where the detection means is a universal class whose instantiated object performs the detection during the running of the compiled program.

FIG. 2 shows the operation of the constructor calling code 152 in the universal object 150' in initiating the instantiation of objects OC-1 and OC-2 that reference the counted object OA.

FIG. 3 shows the operation of the constructor calling code 152 in the universal object 150' in initiating the instantiation of objects OD-1 and OD-2 that reference the uncounted object OB. The universal object 150' initiates the instantiation of the counter wrapper object 130' that will count the number of objects referencing the uncounted object OB.

FIG. 4 shows the operation of the destructor calling code 154 in the universal object 150' in initiating the destruction of objects OC-1 and OC-2 that reference the counted object OA. If the number of referencing objects becomes zero, then the destructor calling code 154 in the universal object 150' initiates the destruction of the referenced object OA.

FIG. 5 shows the operation of the destructor calling code 154 in the universal object 150' in initiating the destruction of objects OD-1 and OD-2 that reference the uncounted object OB. If the number of referencing objects becomes zero, then the destructor calling code 154 in the universal object 150' initiates the destruction of the referenced object OB and the counter wrapper object 130'.

FIGS. 6 through 9 describe the second embodiment, where the detection means is a compiler program that performs the detection while the object oriented program is being compiled.

FIG. 7 illustrates the inheritance relationship of TcountedVoidPointer class to MrcferenceCounted class.

FIG. 8 illustrates the inheritance relationship of Tcounted class and TNotCounted class to MreferenceCounted class.

FIG. 9 shows structures for TCounted instances and TNotCounted instances.

DISCUSSION OF THE PREFERRED EMBODIMENTS

The invention is a mechanism added to the object oriented environment, that monitors objects during their lifetime in the memory. It detects those target objects that do not have an up-down counter destruction feature and then adaptively provides a wrapper for the uncounted objects, the wrapper including an up-down counter destruction feature. A means is provided to determine whether a new target object is from the uncounted object class and, if so, that selectively causes the counter wrapper object to be associated with the new target object. In the first disclosed embodiment described in FIGS. 1 through 5, the detection means is a universal class whose instantiated object performs the detection during the running of the compiled program. In the second disclosed embodiment described in FIGS. 6 through 9, the detection means is a compiler program that performs the detection while the object oriented program is being compiled. The counter wrapper object associated with the new target object, counts the number of objects referencing the new target object and initiates the destruction of the new target object when the number of objects referencing the new target object diminishes to none. In this manner, all target objects that are no longer in use, are automatically removed from the memory.

Figure 1:
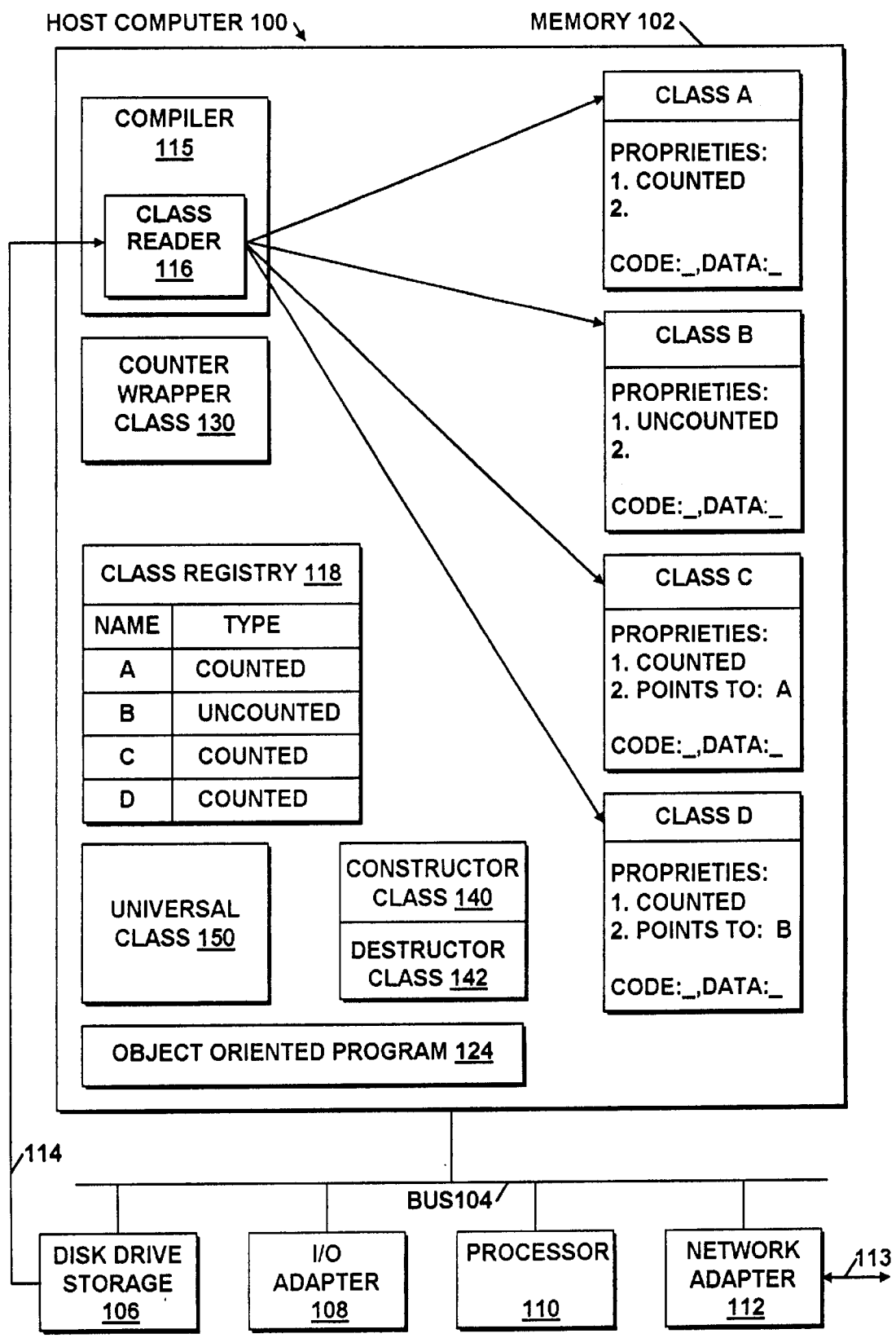
FIG. 1 is an architectural diagram of the host computer 100 running the compiler 115 to compile the various classes of the object oriented program 124 in the memory 102.

FIG. 1 is an architectural diagram of the host computer 100, which includes the memory 102 connected by the bus 104, to the disk drive storage 106, the I/O adapter 108, the processor 110, and the network adapter 112. The network adapter 112 is connected to the network 113. The logical path 114 illustrates the path of a stream of instructions and data that are transferred from the disk drive storage 106 to the compiler 115 in the memory 102. The compiler 115 includes a class reader 116, that reads in the various classes of the object oriented program 124 and compiles the classes for runtime execution. As the class reader reads in the various classes, it builds a class registry 118. Some classes, such as class A, class C, and class D, are of the counted object class type that provides a count of the number of objects referencing a target counted object. Other classes, such as class B, are of the uncounted object class type that does not provide a count of the number of objects referencing a target uncounted object.

In accordance with the invention, a counter wrapper class 130 is included, whose instantiated object 130' provides a count of the number of objects referencing a target uncounted object when the counter wrapper object is associated with the target uncounted object.

Further in accordance with the invention, a universal class 150 is provided, whose instantiated object 150' determines whether a new target object is from the uncounted object class and, if so, that selectively causes the counter wrapper object 130' to be associated with the new target object. The counter wrapper 130' object associated with the new target object, counts the number of objects referencing the new target object and initiates the destruction of the new target object when the number of objects referencing the new target object diminishes to none.

Other classes compiled in FIG. 1 include the object constructor class 140 and the object destructor class 142.

Figure 1A:
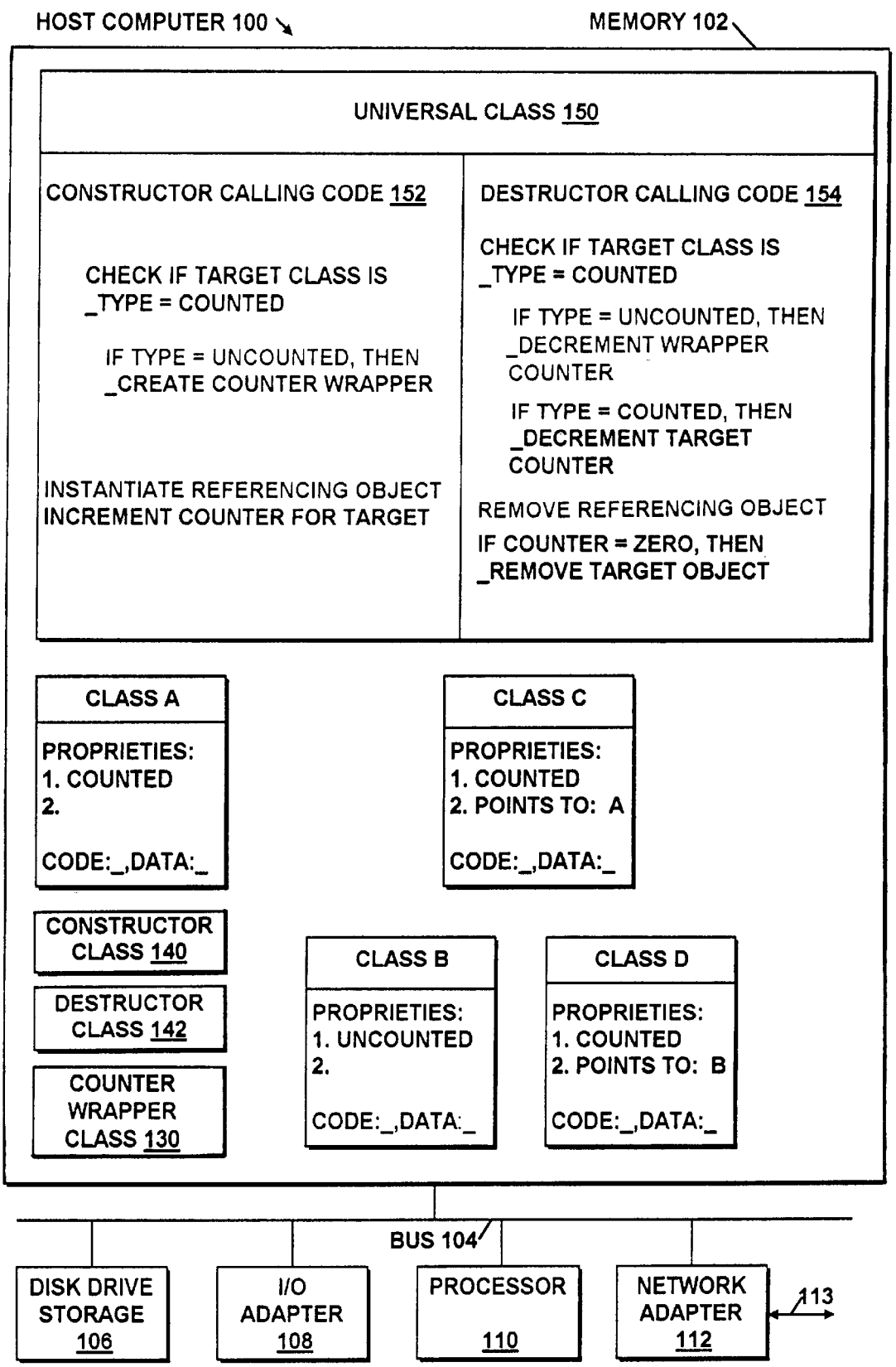
FIG. 1A shows some details of the universal class 150 and other classes that have been complied in the memory 102.
Figure 1B:
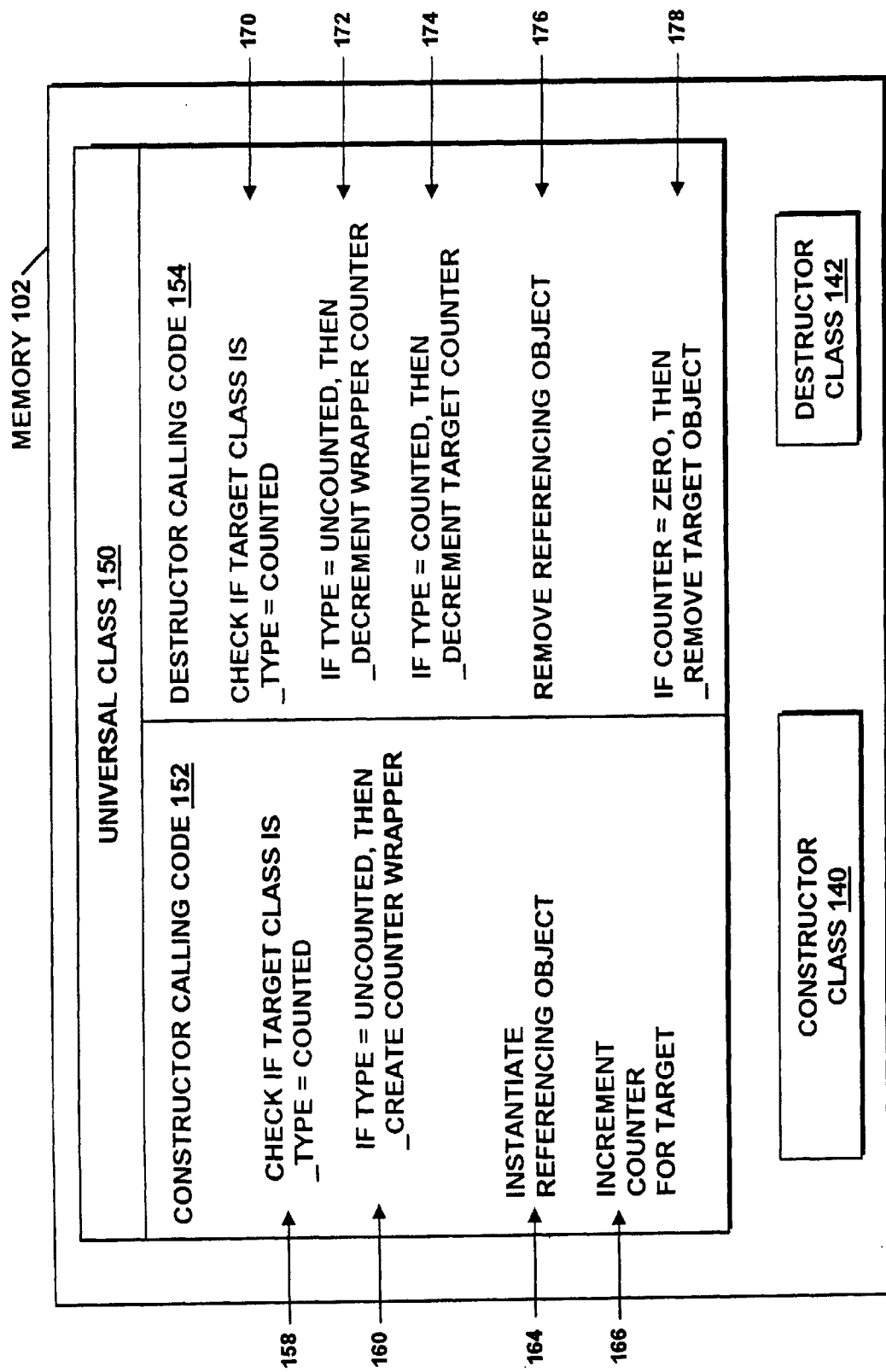
FIG. 1B shows some additional details of the universal class 150.
Figure 1C:
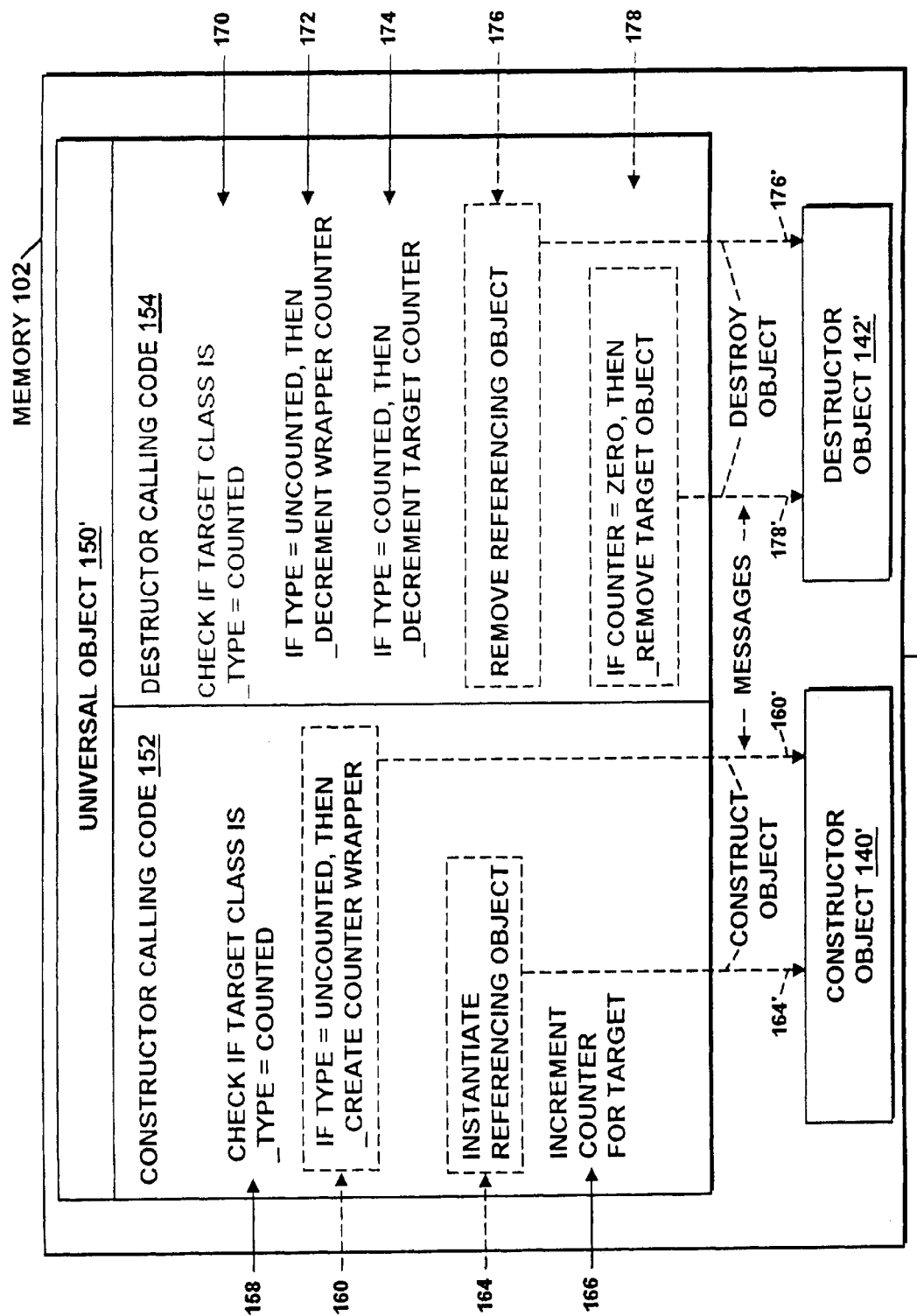
FIG. 1C shows the universal object 150' and the messages it issues to the constructor object 140' and the destructor object 142'.

FIG. 1A shows some details of the universal class 150 and other classes that have been complied in the memory 102. FIG. 1B shows some additional details of the universal class 150. The universal class 150 includes the constructor calling code 152 and the destructor calling code 154. FIG. 1C shows the universal object 150' that is instantiated from the universal class 150 of FIG. 1B. The code 152 and 154 is represented in the universal object 150 ' of FIG. 1C, but it may actually remain in the universal class 150, to be invoked when needed by the universal object 150'. The constructor calling code 152 includes steps 158, 160, 164, and 166. FIG. 1C shows the messages 160' and 164' issued by steps 160 and 164, respectively to the constructor object 140'. The destructor calling code 154 includes steps 170, 172, 174, 176, and 178. FIG. 1C shows the messages 176' and 178' issued by steps 176 and 178, respectively to the destructor object 142'.

Figure 2:
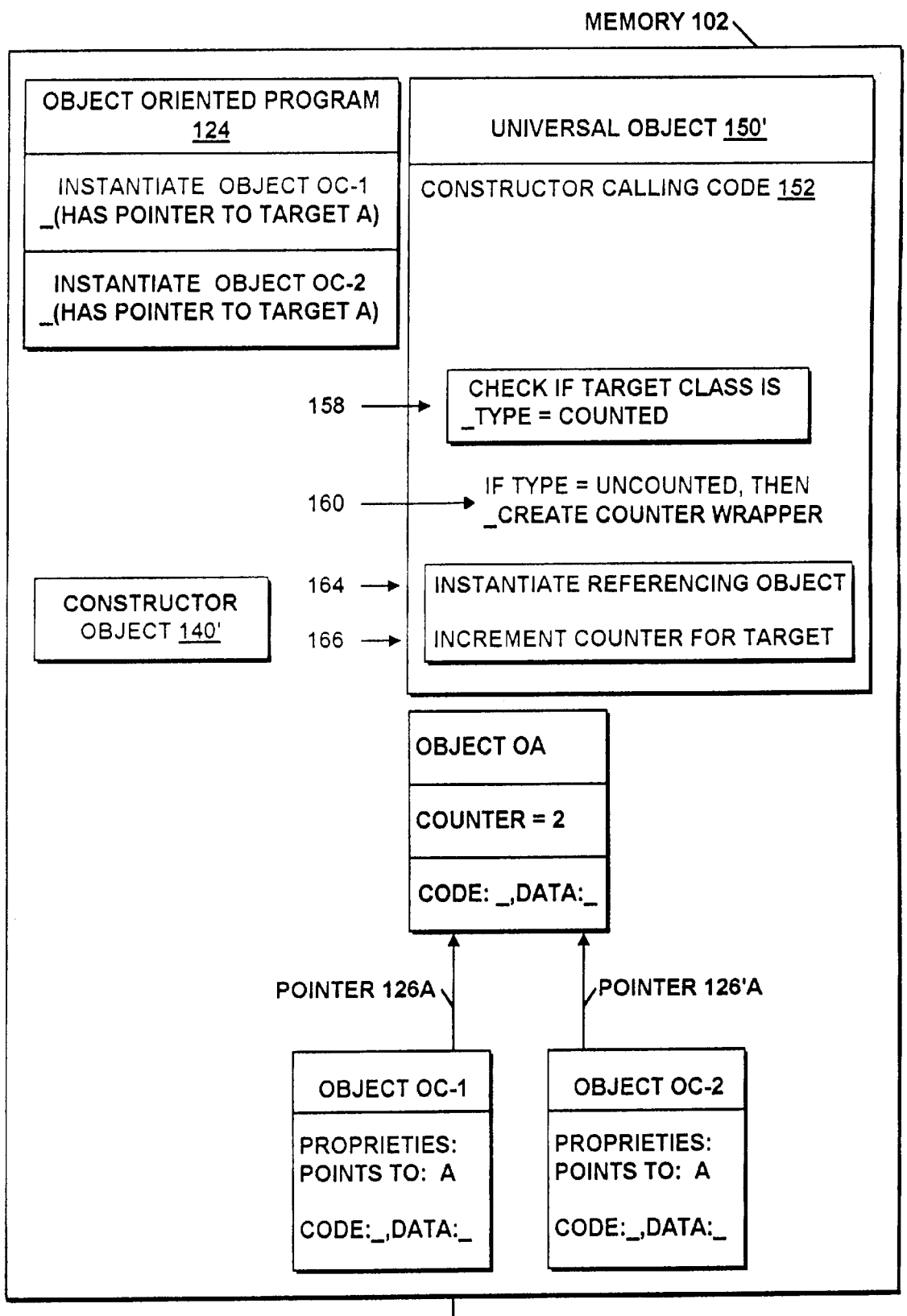

FIG. 2 shows the operation of the constructor calling code 152 in the universal object 150' in initiating the instantiation of objects OC-1 and OC-2 that reference the counted object OA. The constructor calling code 152 initiates instantiation of a referencing object OC-2 in step 164 and increments in the counter in object OA, the number of objects referencing the new target object in step 166. The constructor calling code 152 determines in step 158 whether the new target object OA is from the counted object class. If so, then the constructor calling code 152 invokes the constructor object 140' to instantiate a referencing object OC-1 and initiates incrementing in the counter of the object OA, increasing the recorded number of objects referencing the new target object OA.

Figure 3:
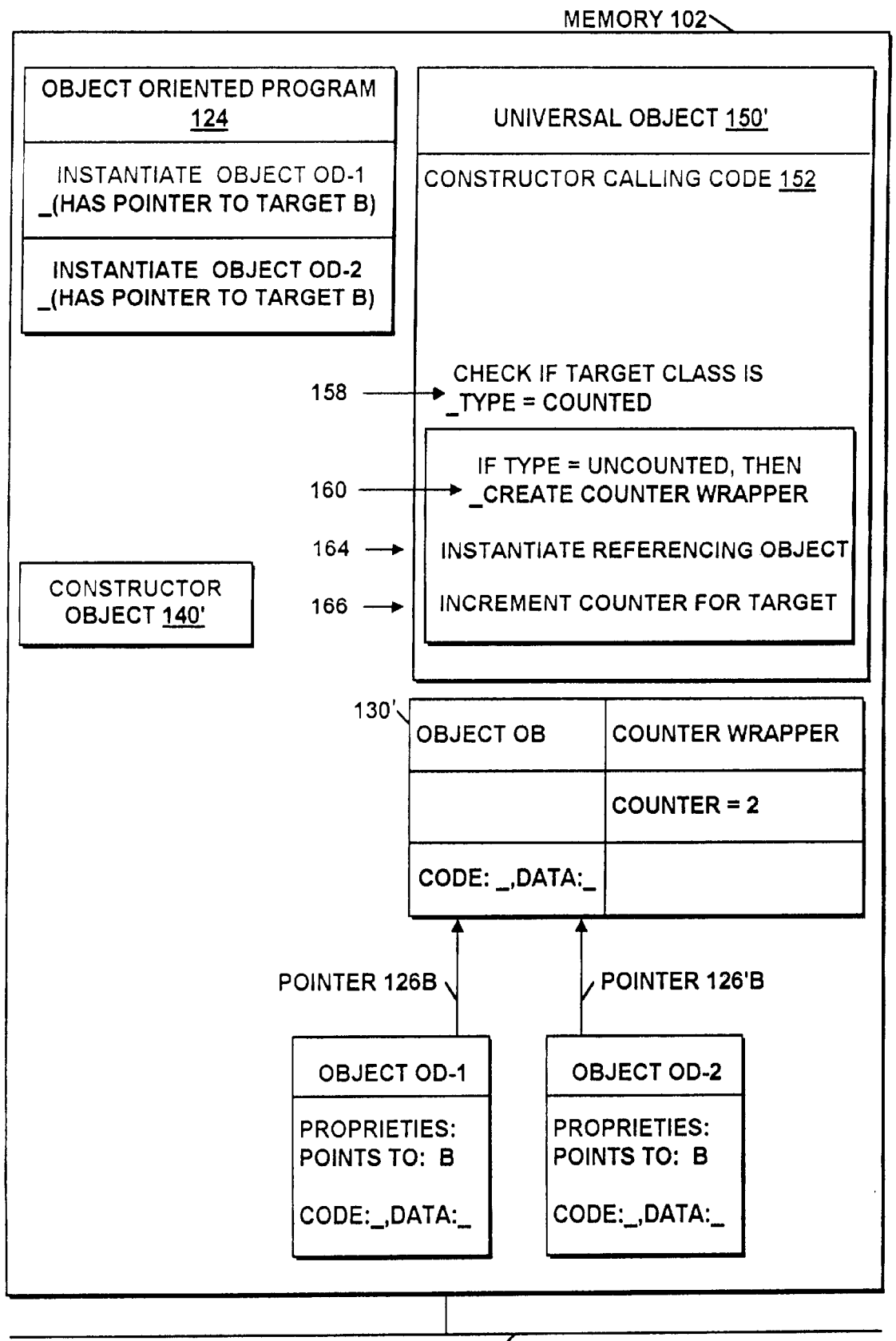

FIG. 3 shows the operation of the constructor calling code 152 in the universal object 150' in initiating the instantiation of objects OD-1 and OD-2 that reference the uncounted object OB. The universal object 150' initiates the instantiation of the counter wrapper object 130' that will count the number of objects referencing the uncounted object OB. In FIG. 1B and FIG. 1C, the constructor calling code 152 determines in step 158 whether the new target object OB is from the uncounted object class. If so, then the constructor calling code 152 selectively invokes a constructor object 140' in step 160 to instantiate the counter wrapper object 130' to be associated with the new target object OB. Then, the constructor calling code 152 invokes the constructor object 140' to instantiate a referencing object OD-1 in step 164. Then, the constructor calling code 152 initiates incrementing in the counter of the counter wrapper object 130', increasing the recorded number of objects referencing the new target object OB, in step 166.

Figure 4:
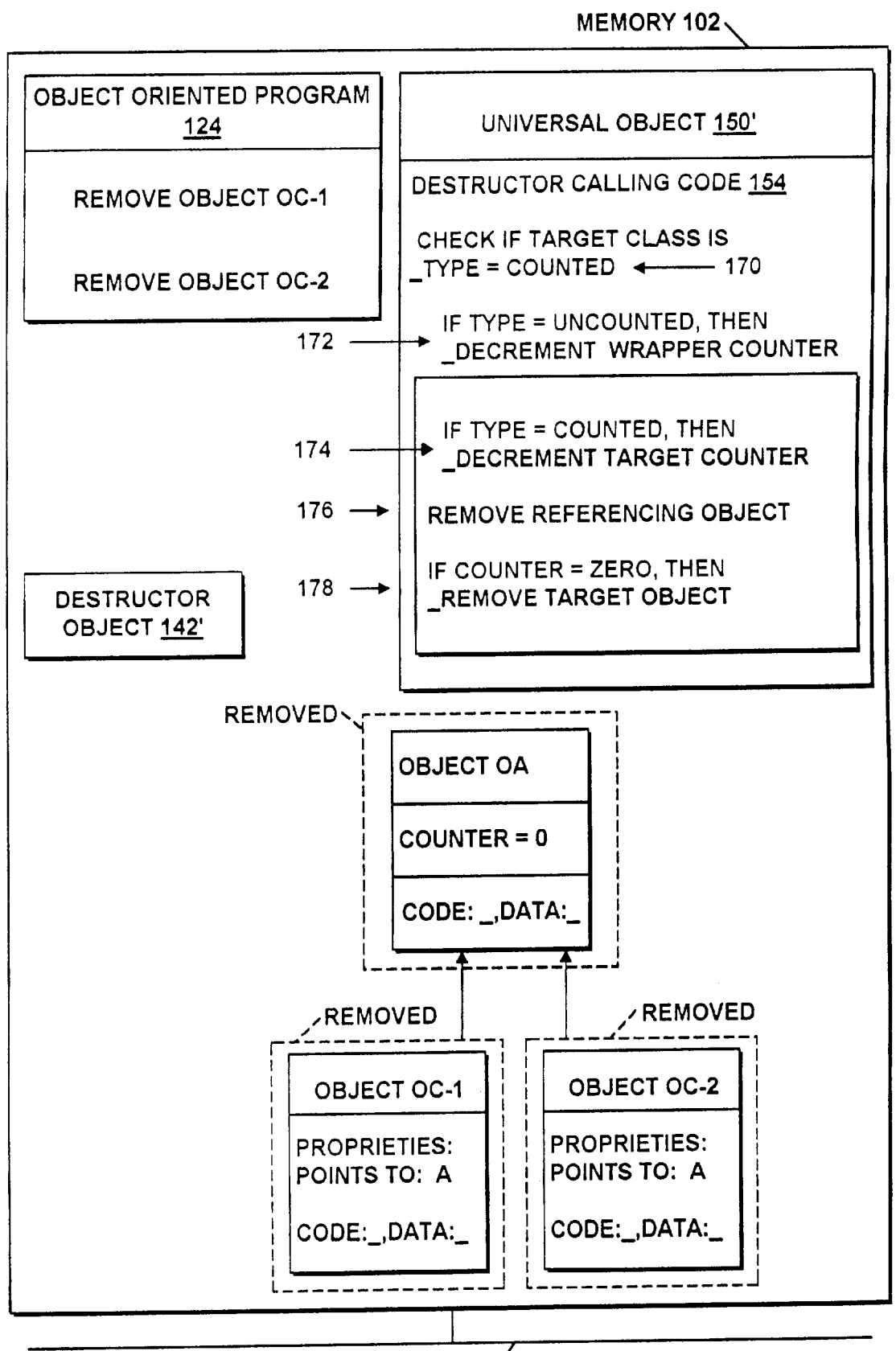

FIG. 4 shows the operation of the destructor calling code 154 in the universal object 150' in initiating the destruction of objects OC-1 and OC-2 that reference the counted object OA. If the number of referencing objects becomes zero, then the destructor calling code 154 in the universal object 150' initiates the destruction of the referenced object OA. The destructor calling code 154 invokes the destructor object 142' to destroy an object OC-2 referencing the new target object OA. The destructor calling code 154 invokes the destructor object 142' to destroy an object OC-1 or OC-2 referencing the new target object OA. The destructor calling code 154 determines whether the new target object OA is from the counted object class. If so, then the destructor calling code 154 selectively initiates in step 174, decrementing the counter in the object OA, decreasing the recorded number of objects referencing the new target object OA. Then, the destructor calling code 154 invokes the destructor object 142' to destroy the new target object OA if the recorded number of objects in the counter in object OA, referencing the new target object OA, diminishes to none.

Figure 5:
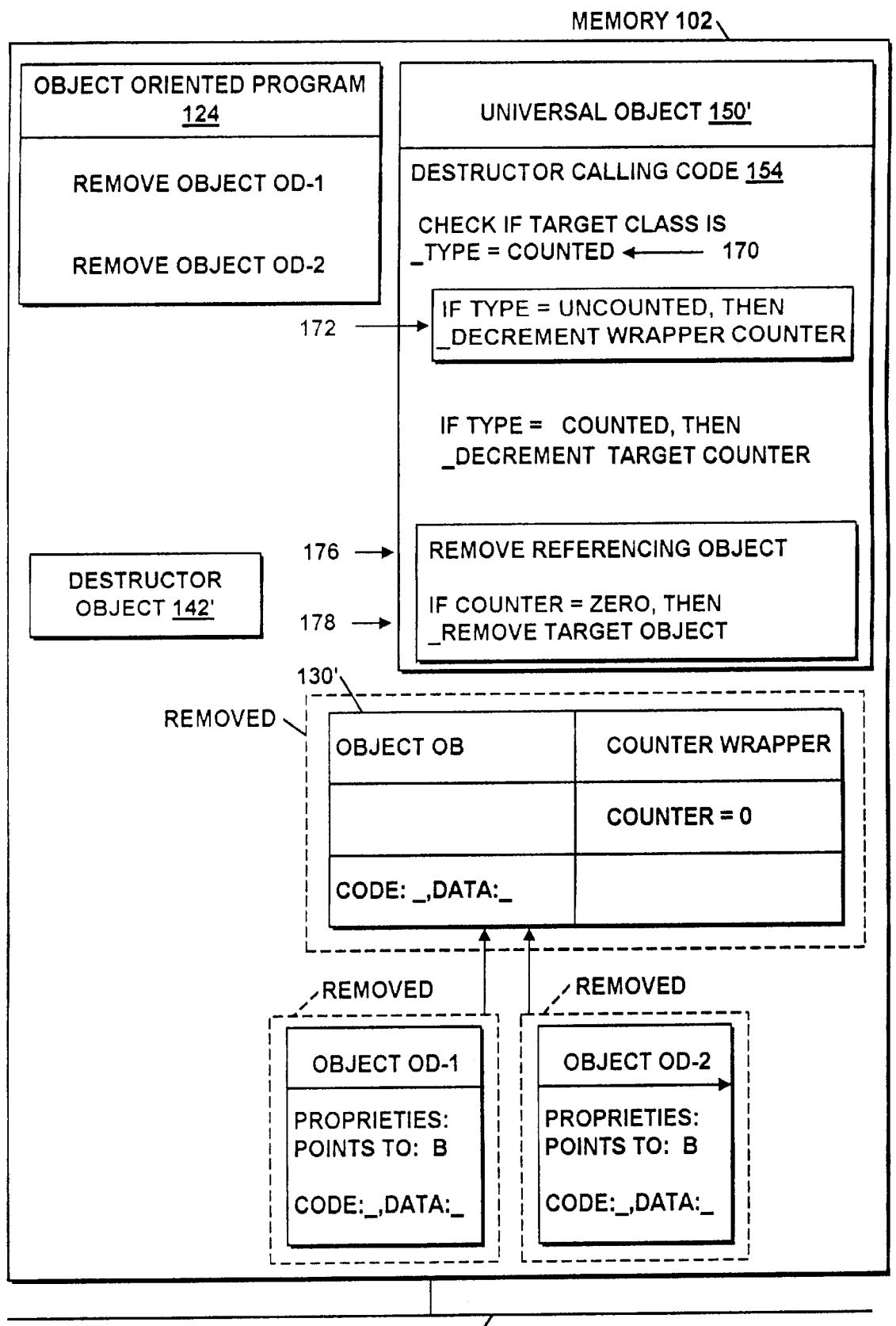

FIG. 5 shows the operation of the destructor calling code 154 in the universal object 150' in initiating the destruction of objects OD-1 and OD-2 that reference the uncounted object OB. If the number of referencing objects becomes zero, then the destructor calling code 154 in the universal object 150' initiates the destruction of the referenced object OB and the counter wrapper object 130'. The destructor calling code 154 determines whether the new target object OA is from the uncounted object class in step 170. If so, then the destructor calling code 154 selectively initiates decrementing the counter in the counter wrapper 130', reducing the recorded number of objects referencing the new target object OB. Then, the destructor calling code 154 invokes a destructor object 142' to destroy the counter wrapper object 130' and the new target object OB if the recorded number of objects in the counter in the wrapper 130', referencing the new target object OB, diminishes to none.

In the second disclosed embodiment described in FIGS. 6 through 9, the detection means is a compiler program that performs the detection while the object oriented program is being compiled. It detects those target objects that do not have an up-down counter destruction feature and then adaptively provides a wrapper for the uncounted objects, the wrapper including an up-down counter destruction feature.

C++ templates are a powerful tool for design reuse: they provide a boiler-plate mechanism for designing and implementing a class or function over an open-ended set of types. True to its flexible nature, C++ also supports the ability to provide custom template implementation for particular types. The invention introduces a technique which allows class template designers to provide custom implementation for families of types.

Background: Given the following function template:
template <class A type> void Foo (const A Type& it)
{
   it.AFunction();
}
The code:
TBar aBar;
Foo (aBar);
results in a call to TBar::AFunction(). When the compiler first sees the call to Foo(const TBar&) it uses the template to generate the function:
void Foo (const TBar& it)//Compiler generated from template
{
   it.AFunction();
}
Similarly, calling Foo(Const TWidge&) causes the generation of another function:
void Foo (const TWidget & it)//Compiler generated from template
{
   it.AFunction();
}
where only the type differs. This is the normal behavior expected with C++ templates. It is called 'implicit specialization'.

What if you want a different implementation for a particular type? C++ supports this through what is called 'explicit specialization'. Just provide your own version of the function:
void Foo< >(const TWidget& it)//You write
{
   it.AnotherFunction();
}
and any call to Foo() which passes a TWidget will result in a call to TWidget::Another-Function().

Explicit specializations are more obviously useful when you consider class templates. C++ allows you to replace a single member function, multiple member functions, or the entire class using explicit specializations. This comes in quite handy when a class template is almost, but not quite, what you want: you can replace the appropriate functions and still take advantage of the provided ones.

Given the above specialization, what happens when you call Foo() with a class derived from TWidget: does the compiler call your specialization or generate a new function from the template? Overload resolution will match your function and the compiler will call it.

For class templates, the answer is different. Generated classes (those generated from a class template) have no inheritance relationship. Given the following class template:
template <class AType> class TKeyFor{public:
   TKeyFor (const AType*aKeyAlias);~TKeyFor();
   HashResult ComputeHash() const;
private:
   AType*fkey;
};
template <class AType>
HashResult TKeyFor<AType>::ComputeHash() const
{
   return fKey→Hash();//Use AType::Hash().
}
TKeyFor<TBase> is unrelated to TKeyFor<TDerived>, even though TBase is the parent of TDerived. Let's suppose that TBase has a different hash function and that you've specialized ComputeHash() for TBase:
HashResult TKeyFor<TBase>::ComputeHash()
{
   return fKey→GetHashKey();//Use TBase::GetHashKey().
}
and you instantiate a TKeyFor<TDerived>, the compiler will not use your specialization. So what do you do? You could provide another specialization for TDerived, but what happens when you introduce TVeryDerived and TVeryVeryDerived, etc.? This presents a problem.

As with function templates, the answer to this problem lies with overload resolution: get the compiler to pick the correct function for you. Using our TKeyFor<AType> example, we first add a pair of private overloaded functions:
template <class AType> class TKeyFor {
public:
   TKeyFor (const AType*aKeyAlias);
   ~TKeyFor();
   HashResult ComputeHash() const;
   . . .
private:
   static HashResult Hash (const void*);
   static HashResult Hash (const TBase*);
   AType*fKey;
};
template <class AType> inline
HashResult TKeyFor<AType>::Hash (const void*)
{
   return fKey→Hash();//Use AType::Hash().
}
template <class AType> inline
HashResult TKeyFor<AType>:: Hash (const TBase*)

```
{
  return       fKey→GetHashKey();//Use
      TBase::GetHaslKey().
}
```
and re-implement ComputeHash to call them:
```
template <class AType>
HashResult TKeyFor<AType>::ComputeHash()const
{
  return Hash(fKey);//Use TKeyFor<AType>::Hash( . . .
      ).
}
```

Now your specialization is built-in: when the compiler generates code for the ComputeHash function, it will call AType::GetHashKey() for any AType which is-a TBase, and will call AType::Hash() for any AType which is not.

This technique can be extended to support multiple type families by providing additional overloaded functions for each family.

This technique exploits a unique advantage of templates: at class generation time, the compiler can statically determine which of the overloaded functions to call. This means that the compiler does not need to emit code for the unused functions, thus reducing code bloat. In addition, we can make the overloaded functions inline, eliminating the runtime-overhead of a function call dispatch. What's left is an implementation customized for a whole family of types (TBase and all subclasses) or a generic implementation for all other types, with zero runtime or footprint overhead.

To further illustrate this last point, imagine that we want to add the ability to test whether or not AType is-a TBase. Again, we use function overloading to add the following (probably private) functions:
```
template <class AType> inline
bool TKeyFor<AType>::IsTBase (const TBase*it) const
{
  return true;
}
template <class AType> inline
bool TKeyFor<AType>::TsTBase (const void*it) const
{
  return false;
}
template <class AType> inline
bool TKeyFor<ATpe>::IsTBase() const
55
  return IsTBase (fKey);
}
```
Now, suppose we want to use this functionality to conditionally execute some code:
```
{
  if (IsTBaseo)
  {
    //Some TBase related code . . .
  }
  else
  {
    //Some generic code . . .
  }
}
```
Since the compiler can statically determine the result of calling IsTBase ()for any given AType, the conditional code can be eliminated and the entire statement reduced to either:
```
{
  Some TBase related code . . .
}
```
if AType is-a TBase, or;
```
{
  //Some generic code . . .
}
```
otherwise.

Figure 6:
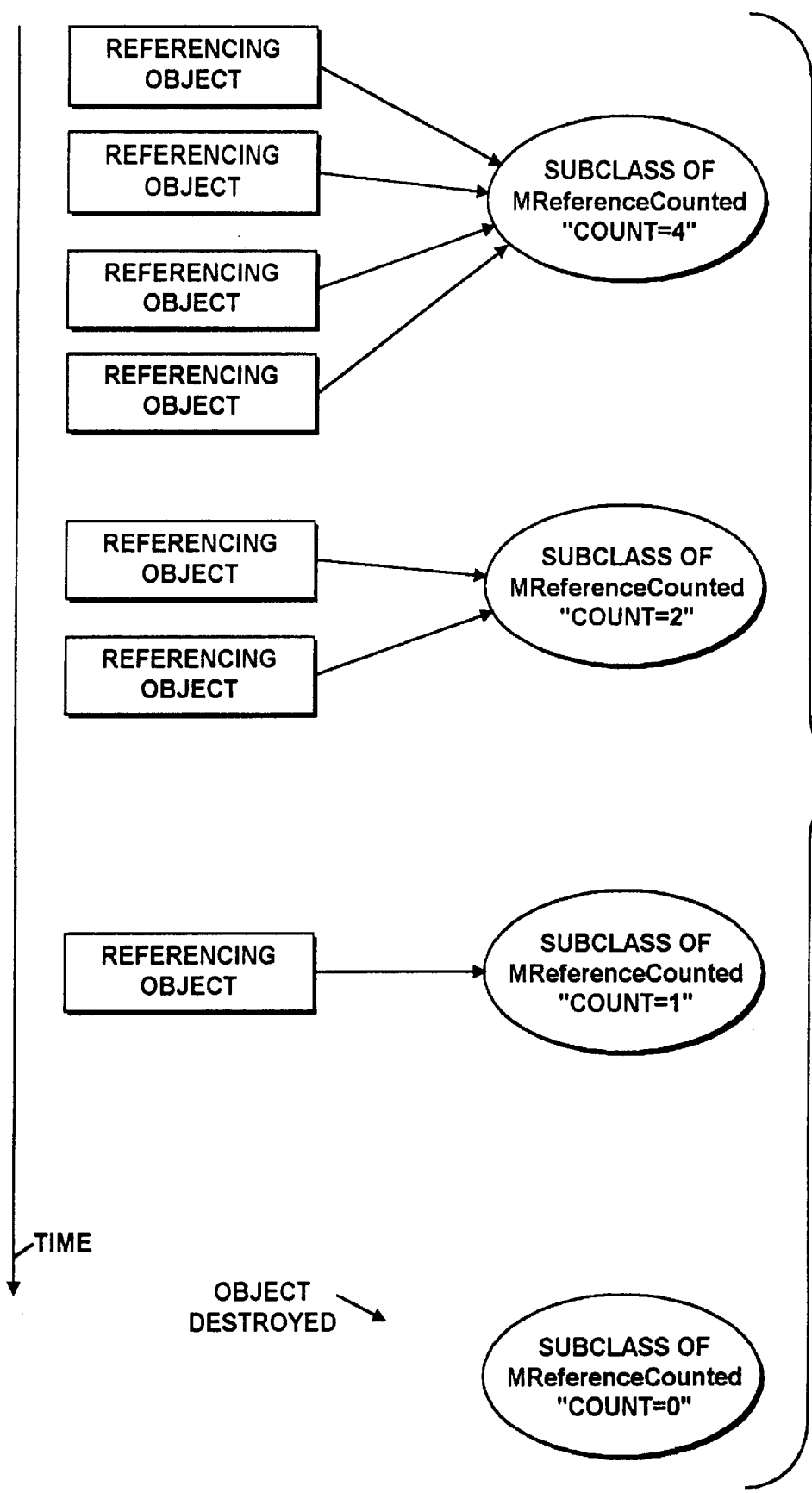
FIG. 6 illustrates the progressive de-referencing of an MreferenceCounted subclass.

An example implementation of the invention follows:

The Common Point™ application system architecture is described by Sean Cotter and Mike Potel in the book *Inside Taligent Technology,* Addison Wesley, 1995. Common Point™ contains an abstract class MReferencedCounted, Which enables a style of lifetime-management called reference counting:
```
class MReferencedCounted {
public:
  void AddReference();
  void RemoveReference();
  . . .
  virtual~MReferenceCounted();
protected:
  MReferencedCounted (ReferenceCount initial=0);
  . . .
};
```
The idea is that an instance (of a subclass of MReferenceCounted) can be shared by multiple objects, each of whom calls AddReferenceo when a pointer to the shared instance is acquired, and each of whom calls RemoveReferenceo when the shared instance is no longer referenced. When RemoveReferenceo detects that there are zero remaining references, it calls its own destructor:

See FIG. 6 which illustrates the progressive de-referencing of an MreferenceCounted subclass. This behavior enables objects to share an instance without concern for lifetime—the instance self-destructs when the last reference to it goes away.

CommoniPoint™ also contains a 'smart' pointer class which ensures that AddReference() and RemoveReference() are called at the appropriate times: TCountedPointerTo<AType>. This class behaves much like a raw pointer (defines operator→, etc.), with the additional behavior of calling AddReference() on construction and RemoveReference() on destruction or assignment:

TCountedPointerTo<TFoo> aFooPtr=new TFoo;//
    Count==1
aFooPtr→AFunction(),//Call TFoo::AFunction().
{
TCountedPointerTo<TFoo> anotherFooPtr=aFooPtr;//
    Count ==2
//Count==1 (anotherFooPtr destroyed st scope exit)
aFooPtr=NIL;//Count==0, TFoo destroyed.

A simple implementation of this class template could assume that AType is—a MReferenceCounted, but it can be extremely useful to have the TCountedPointerTo Behavior over instances of classes which are not MReferenceCounted.

Figure 7:
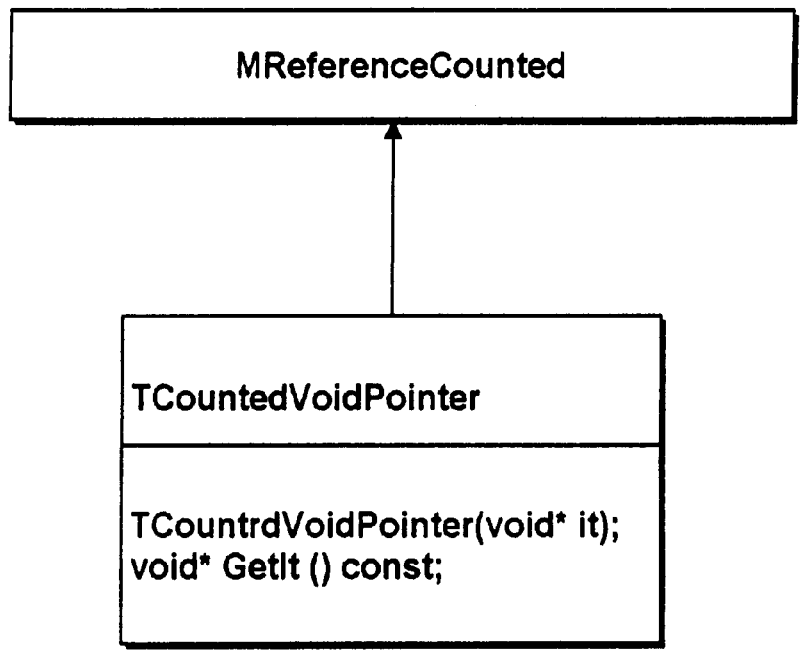

We could implement a different class template, say TUniversalCountedPointerTo<AType>, which assumes that AType is not MReferenceCounted. Its implementation would wrap the AType instance in an object which is MreferenceCounted. FIG. 7 illustrates the inheritance relationship of TcountedVoidPointer class to Mreference-Counted class.

Of course, it would be easier for clients to deal with only one class, irrespective of AType. With our new technique, we can provide such a class template which works efficiently for AType's which are MReferenceCounted and those that are not—the TCountedPointerTo<AType> class template provided by CommonPoint™ does just that.

Here is a partial declaration for TCountedPointerTo<AType>:

```
template<class AType> class TCountedPointerTo {
public:
    TContedPointerTo (AType*adopt);
    TContedPointerTo (const TContedPointerTo
        <AType>& share);
    ~TContedPointerTo();
    AType*GetAlias() const;
    AType*operator→() const;
private:
    void WrapIt (MReferencedCounted*it) const;
    void WrapIT (void*it) const;
    MReferencedCounted*GetCounted () const;
    bool IsWrapped () const;
    bool IsWrapped (MReferencedCounted*) const;
    bool IsWrapped (void*it) const;
    . . .
    union
    {
        AType*fDirect;
        TCountedVoidPointer*fIndirect;
    };
};
```

The (simplified) implementations for the key functions follow:

```
template <class AType> inline
TCountedPointerTo<AType>::TCountedPointerTo
    (AType*adopt)
    fdirect (adopt)
{
    WrapIT(adopt);
    GetCounted()→AddReferenced();
}
template <class AType> inline void
TCountedPointerTo<AType>::TCountedPointerTo
    (avoid*it) const
{
    fIndirect=new TCountedPointerTo(it);//Make a wrapper.
template <class AType> inline
    MReferenceCounted*TCountedPointerTo<AType>::
    GetCounted()const
{
    if (IsWrapped())
    }
        return findirect;
    }
    else
    {
        return (MReferenceCounted*) fdirect;
    }
}
template <class AType> inline
TCountedPointerTo<AType<::~TCountedPointerTo()
{
    GetCounted()→RemoveReference();
}
template <class AType> inline
AType*TCountedPointerTo<AType>::GetAlias() const
{
    IF (IsWrapped())
    {
        return (AType*)fIndirect→Getit();
    }
    else
    {
        return fDirect;
    }
}
template <class AType> inline
AType*TCountedPointerTo<AType>::operator→() const
{
    return GetAlias();
}
```

Where Is Wrapped() is implemented as in the TKeyFor<AType>::IsTBase() example.

Figure 8:
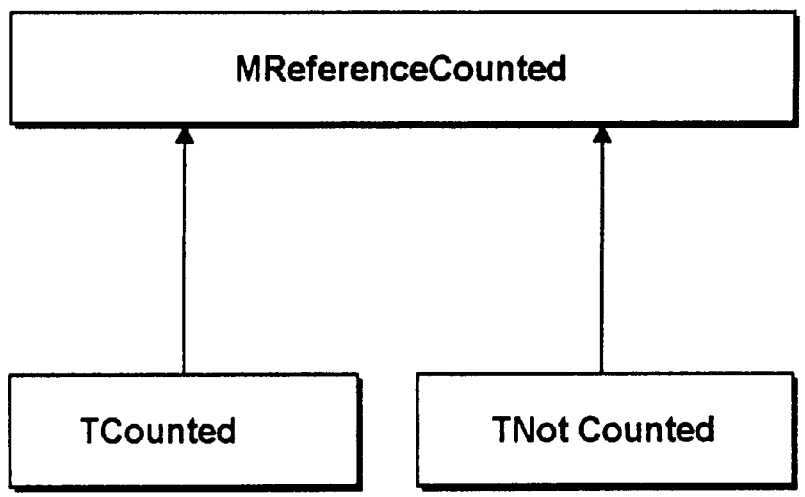

Given the existence of a class TCounted, which is-a MReferenceCounted, and a class TNotCounted which is not MreferenceCounted. FIG. 8 illustrates the inheritance relationship of Tcounted class and TNotCounted class to MreferenceCounted class.

Counted pointer instances can now be created for both types:
TCountedPointerTo<TCounted> counted1=new TCounted;
TCountedPointerTo<TCounted> counted2=counted1;
TCountedPointerTo<TNotCounted> notCounted1=new TNotCounted;
TCountedPointerTo<TNotCounted> notCounted2= notCounted1

Figure 9:
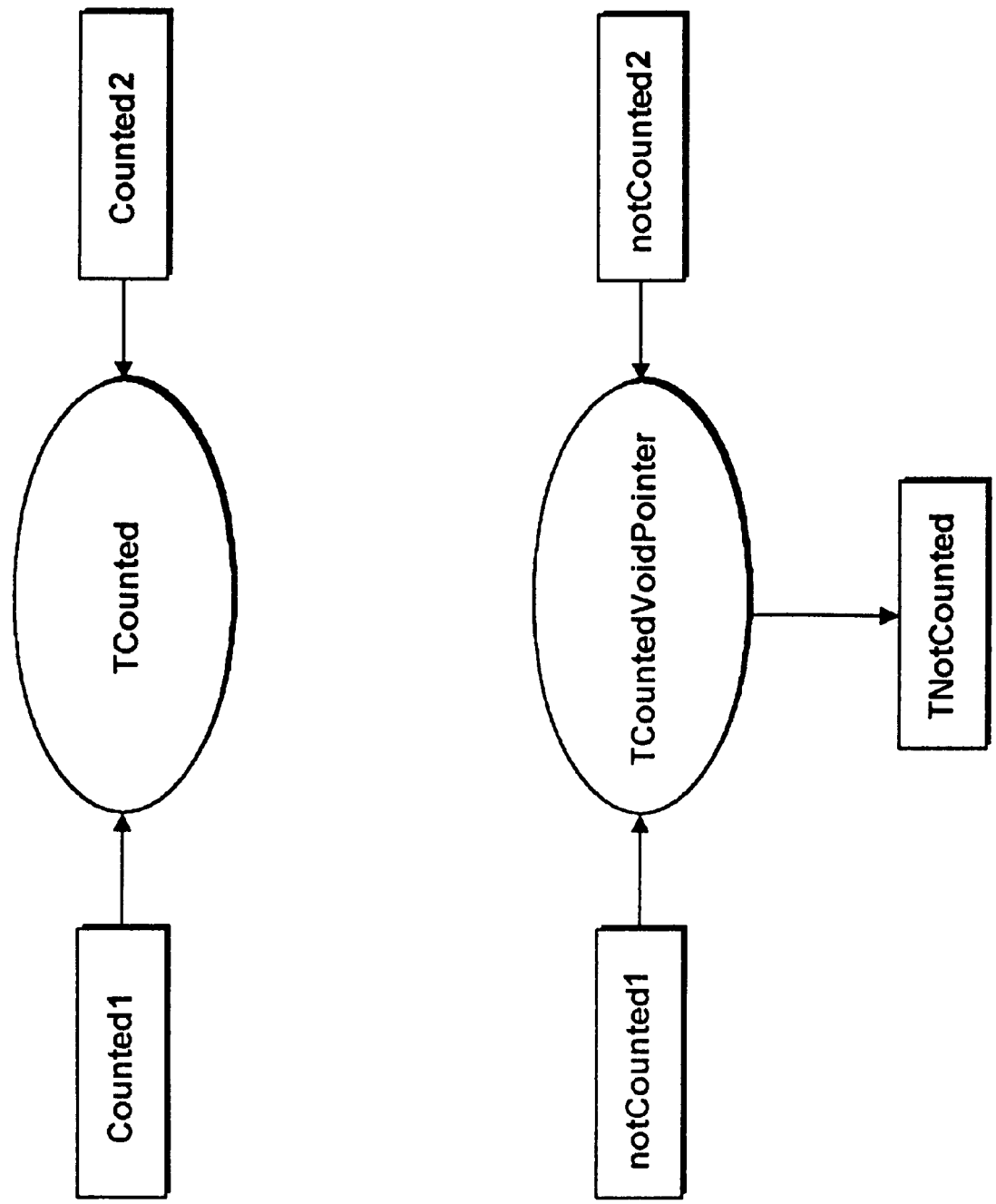

This results in the following structures. FIG. 9 shows structures for TCounted instances and TNotCounted instances.

The code generated for each is exactly as efficient as if two separate class templates had been written, without the attendant documentation, learning-curve and namespace clutter of an additional class.

Although a specific embodiment of the invention has been disclosed, it will be understood by those having skill in the art that changes can be made to that specific embodiment without departing from the spirit and the scope of the invention.

What is claimed is:

1. Apparatus for managing the life of objects referenced by other objects in a computer including a memory having therein counted classes that maintain an internal count of the number of other objects referencing a counted object constructed therefrom and uncounted classes which do not maintain an internal count of the number of other objects referencing an uncounted object constructed therefrom, the apparatus comprising:

a counter wrapper class that includes an internal counter and an object reference storage; and a universal object in the memory that responds to a runtime request for constructing a new target object from a target class and includes a method which responds to the runtime request by constructing a counter wrapper object from the counter wrapper class when the target class is an uncounted class and then constructing an object from the target class and storing a reference thereto in the counter wrapper object, the counter wrapper object providing a count of the number of other objects referencing the target object, the universal object further including a method that responds to the runtime request by constructing a new target object from the target class when the target class is a counted class.

2. The apparatus of claim 1, which further comprises constructor code in a referencing object class that is operable during construction of a referencing object for incrementing the number of objects referencing the new target object stored in the new target object when the new target object is created from a counted class.

3. The apparatus of claim 2, which further comprises destructor code in the referencing object that decrements the number of objects referencing the new target object stored in the new target object before destroying the referencing object.

4. The apparatus of claim 3, which further comprises destructor code in the new target object which destroys the new target object when the number of referencing objects stored in the new target object decreases to zero.

5. The apparatus of claim 1, which further comprises constructor code in a referencing object class which is operable during the construction of a referencing object for incrementing the number of objects referencing the new target object stored in the counter wrapper object when the new target object is constructed from an uncounted class.

6. The apparatus of claim 5, which further comprises destructor code in the referencing object that decrements the number of objects referencing the new target object stored in the counter wrapper object new target object before destroying the referencing object.

7. The apparatus of claim 6, which further comprises destructor code in the counter wrapper object that destroys the counter wrapper object and the new target object when the number of referencing objects stored in the counter wrapper object decreases to zero.

8. A method for managing the life of objects referenced by other objects in a computer including a memory having therein counted classes that maintain an internal count of the number of other objects referencing a counted object constructed therefrom and uncounted classes which do not maintain an internal count of the number of other objects referencing an uncounted object constructed therefrom, the method comprising:

(a) creating in the memory a counter wrapper class that includes an internal counter and an object reference storage; and (b) creating a universal object in the memory that responds to a runtime request for constructing a new target object from a target class and includes a method which responds to the runtime request by constructing a counter wrapper object from the counter wrapper class when the target class is an uncounted class and then constructing an object from the target class and storing a reference thereto in the counter wrapper object, the counter wrapper object providing a count of the number of other objects referencing the target object, the universal object further including a method that responds to the runtime request by constructing a new target object from the target class when the target class is a counted class.

9. The method of claim 8, which further comprises using constructor code in a referencing object during construction of the referencing object for incrementing the number of objects referencing the new target object stored in the new target object when the new target object is created from a counted class.

10. The method of claim 9, which further comprises using destructor code in the referencing object to decrement the number of objects referencing the new target object stored in the new target object before destroying the referencing object.

11. The method of claim 10, which further comprises using destructor code in the new target object which destroys the new target object when the number of referencing objects stored in the new target object decreases to zero.

12. The method of claim 8, which further comprises using constructor code in a referencing object class which is operable during the construction of a referencing object for incrementing the number of objects referencing the new target object stored in the counter wrapper object when the new target object is constructed from an uncounted class.

13. The method of claim 12, which further comprises using destructor code in the referencing object that decrements the number of objects referencing the new target object stored in the counter wrapper object new target object before destroying the referencing object.

14. The method of claim 13, which further comprises using destructor code in the counter wrapper object that destroys the counter wrapper object and the new target object when the number of referencing objects stored in the counter wrapper object decreases to zero.

15. A computer program product for managing the life of objects referenced by other objects in a computer including a memory having therein counted classes that maintain an internal count of the number of other objects referencing a counted object constructed therefrom and uncounted classes which do not maintain an internal count of the number of other objects referencing an uncounted object constructed therefrom, the computer program product comprising a computer usable medium having computer readable program code thereon including:

counter wrapper class code that includes an internal counter and an object reference storage; and program code for instantiating a universal object in the memory that responds to a runtime request for constructing a new target object from a target class and includes a method which responds to the runtime request by constructing a counter wrapper object from the counter wrapper class when the target class is an uncounted class and then constructing an object from the target class and storing a reference thereto in the counter wrapper object, the counter wrapper object providing a count of the number of other objects referencing the target object, the universal object further including a method that responds to the runtime request by constructing a new target object from the target class when the target class is a counted class.

16. The computer program product of claim 15, which further comprises constructor code in a referencing object class that is operable during construction of a referencing object for incrementing the number of objects referencing the new target object stored in the new target object when the new target object is created from a counted class.

17. The computer program product of claim 16, which further comprises destructor code in the referencing object that decrements the number of objects referencing the new target object stored in the new target object before destroying the referencing object.

18. The computer program product of claim 17, which further comprises destructor code in the new target object which destroys the new target object when the number of referencing objects stored in the new target object decreases to zero.

19. The computer program product of claim 15, which further comprises constructor code in a referencing object class which is operable during the construction of a referencing object for incrementing the number of objects referencing the new target object stored in the counter wrapper object when the new target object is constructed from an uncounted class.

20. The computer program product of claim 19, which further comprises destructor code in the referencing object that decrements the number of objects referencing the new target object stored in the counter wrapper object new target object before destroying the referencing object.

21. The computer program product of claim 15, which further comprises destructor code in the counter wrapper object that destroys the counter wrapper object and the new target object when the number of referencing objects stored in the counter wrapper object decreases to zero.

* * * * *